(No Model.) 2 Sheets—Sheet 2.
C. GODDARD.
JUNCTION FOR ELECTRICAL CONDUCTORS.
No. 287,532. Patented Oct. 30, 1883.
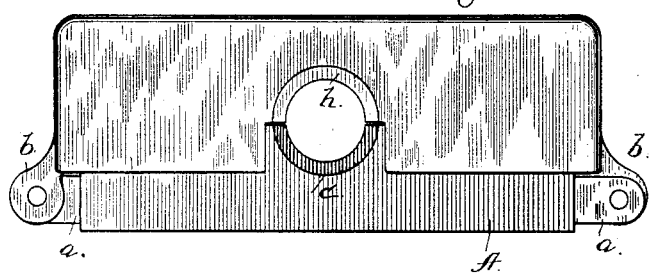
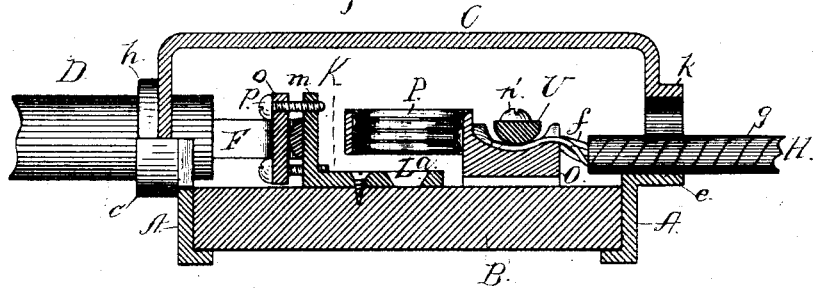
ATTEST: INVENTOR:

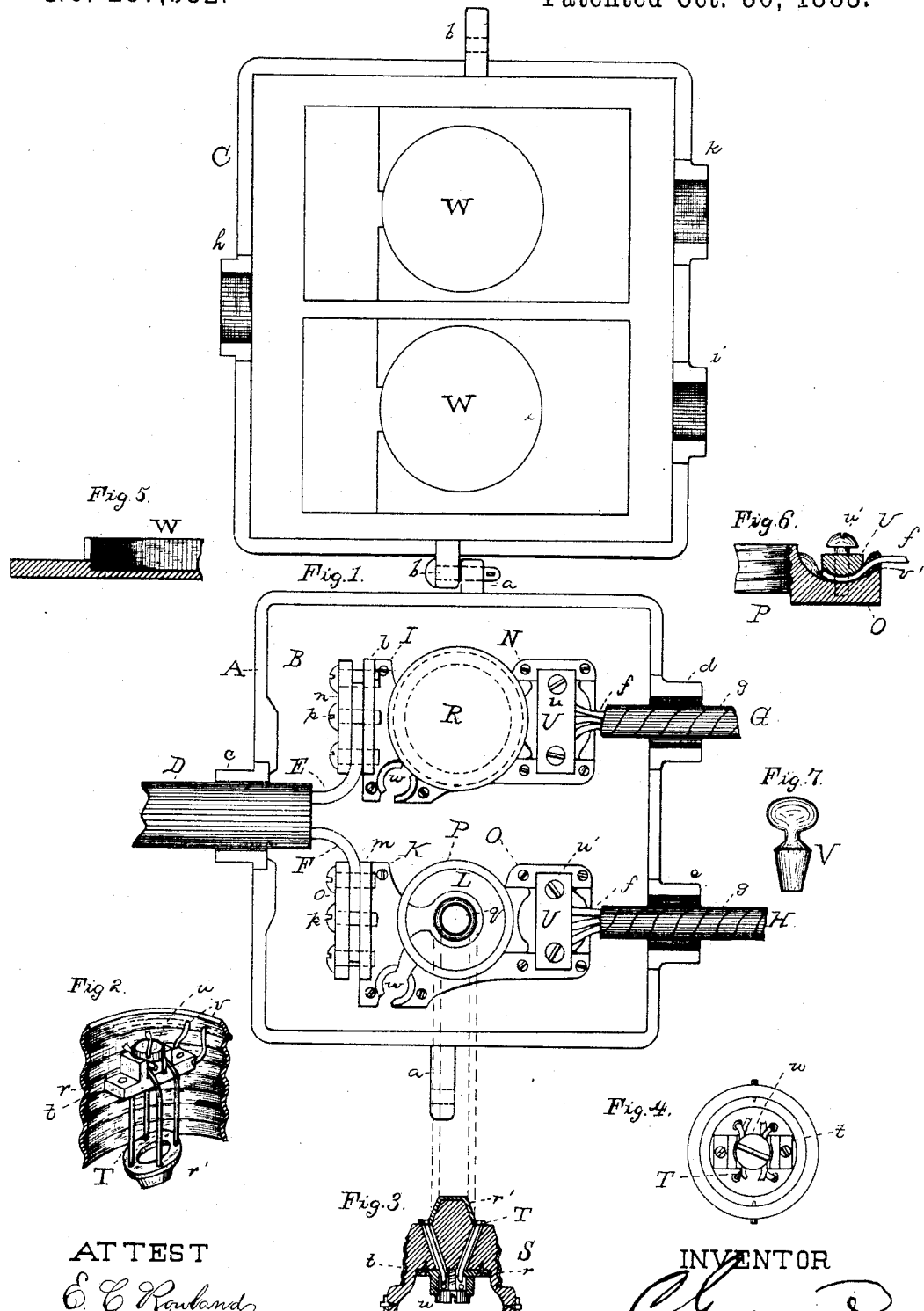

United States Patent Office.

CALVIN GODDARD, OF NEW YORK, N. Y., ASSIGNOR TO THE EDISON ELECTRIC LIGHT COMPANY, OF SAME PLACE.

JUNCTION FOR ELECTRICAL CONDUCTORS.

SPECIFICATION forming part of Letters Patent No. 287,532, dated October 30, 1883.

Application filed December 8, 1882. (No model.)

*To all whom it may concern:*

Be it known that I, CALVIN GODDARD, of New York city, in the county and State of New York, have invented a certain new and useful Improvement in Junctions for Electrical Conductors, of which the following is a specification.

The object I have in view is to produce simple and efficient means more especially designed for conveniently making connection between the conductors entering a house from the street and the house-conductors in a system of electrical distribution for supplying electrical energy for light, power, and other purposes.

The invention relates more particularly to a simple and compact construction of inclosing-box for carrying and protecting the connections; to means for permitting the introduction of safety-catches into the circuit, and to an efficient construction of the safety-catch plugs; to means for completing the circuit independent of the safety-catches, so that such safety-catches can be readily removed or replaced without breaking circuit; to means for securing a good insulation of the parts within the box in order to prevent the formation of a cross-circuit at this point; to means for making good electrical connection with the conducting-rods from the street, and with the wires forming the house-conductors; and, further, to the several novel details of construction and arrangement, all as fully hereinafter explained.

While the peculiar connections and inclosing-box are especially intended for use at the junction of the conductors from the street and the house wires, it is evident that the features of construction could be used in other locations in a system of electrical distribution.

In the accompanying drawings, forming a part hereof, Figure 1 is a view of the box thrown open, one of the safety-catch plugs being removed; Fig. 2, a perspective view of the terminals of one of the safety-catch plugs, the screw-ring terminal being in section; Fig. 3, a vertical section of one of the safety-catch plugs; Fig. 4, a top view of one of such plugs, the cap of the same being removed; Fig. 5, a sectional view of a portion of one of the insulating-plates used in the box; Fig. 6, a sectional view of one of the wire clamps; Fig. 7, an elevation of a guard-plug; Fig. 8, an end of the box closed, and Fig. 9 a vertical section of the same with the loose insulating-plates and safety-catch plugs removed.

The inclosing-box is made in two parts, preferably rectangular in shape. The lower part is composed of a metallic frame, A, within which is secured a block, B, of wood or other suitable insulating material, upon which insulating-block the connections are made. The upper part is a metallic box, C, which fits over the frame A. Lugs *a b* are used to secure the parts of the box together.

The frame A has at the center of one side a projecting concave flange, *c*, receiving the pipe D from the street, which pipe D carries the conducting-rods E F. At its opposite side the frame A has two projecting concave flanges, *d e*, of smaller size than *c*. These flanges receive the house-conductors G H, each composed of a bunch of insulated wires, *f*, inclosed by an insulating-wrapping, *g*, either protected by a lead pipe or not, as desired. The covering or upper part, C, has flanges *h i k*, corresponding to the flanges *c d e*, but located in recesses in the sides of the box, into which the projecting flanges *c d e* enter, and, meeting the flanges *h i k*, complete the openings for the conductors.

At equal distances from the flange *c*, and on opposite sides thereof, there are secured to the insulating-block B two metal plates, I K, which are bent upwardly on their ends nearest the flange *c* to form clamp-plates *l m*. Movable clamp-plates *n o* are secured by screws *p* to the plates *l m*.

The conducting-rods E F from street-pipe D are bent outwardly at their ends and placed between the stationary and movable clamp-plates *l m* and *n o*, when they are firmly secured by the screws *p*, which draw the plates together upon such conducting-rods, making good electrical contact therewith and firmly holding the conducting-rods.

The plates I K are extended inwardly from the clamps of the conductors E F, and form the bottom plates, L, of the sockets for the safety-catch plugs. Each of these bottom plates is preferably provided with a beveled opening, *q*, made through *t* to receive the conical tip-terminal of the safety-catch plug, whereby an increased contact-surface is obtained. Upon the block B, and in line with the flanges d e, are secured other plates, N O, which are made in one piece with and support metal rings P. These rings are internally screw-threaded and project over the plates L without touching such plates.

The rings P and plates L form sockets to receive the safety-catch plugs R S. These plugs are made of wood or other suitable insulating material, each plug being provided with a screw ring, r, and a conical tip-terminal, r'. The plug is hollowed out at the top, forming a chamber, which is closed by a removable cap, s. Within this chamber is a clamp-plate, t, and clamping-screw u. This clamp-plate is electrically connected with the screw-terminal r by means of copper wires v, which are soldered to such plate and ring.

The safety-catch is composed of two or more lead wires, T, (four being shown,) which are attached to the tip-terminal r', and are clamped under the head of the screw u. The plates N O are formed with transverse depressions, in which rest clamp-plates U, with rounded under sides, said plates being secured by screws u'. The transverse depressions form rounded edges v', over which the wires f, forming the house-conductors, are bent when the plates U are forced downwardly upon them. Good connections are thus made with the house-conductors, which are prevented from pulling out of the box. Outside of the sockets for the safety-catch plugs the plates I K and N O are extended toward each other, and are flanged to form receptacles w for guard-plugs V. By means of these guard-plugs the circuit can be completed around either safety-catch plug, when desired. This will be done before putting a safety-catch plug into or removing it from its socket in order to prevent sparking. It may also be found desirable to complete the circuit by means of a guard-plug during the interval between the destruction of a safety-catch and its replacement by a complete plug.

To prevent the possibility of a cross-connection being formed through the cover C, loose plates W, of wood or other suitable insulating-material, are employed, which are shaped to fit over the caps of the safety-catch plugs, being provided for that purpose with circular depressions x. These plates are placed upon the safety-catch plugs, and the cover of the box is then closed down upon them and secured.

I have shown and described herein the use of a particular construction of safety-catch plugs and receptacles, and also the use of means for completing circuit around the safety-catches, because these form parts of the general arrangement of devices which I prefer to employ. I do not, however, claim herein such features *per se*, for I propose to make them the subject of one or more separate applications for patents. And it is to be understood that all patentable features of invention shown or described but not claimed herein are reserved for protection by other patents, and will be embraced in other applications for Letters Patent.

What I claim is—

1. A box for electrical connections, provided with a base of insulating material upon which the connections are made, a cover, and openings through the sides of the box for admitting the conductors, substantially as set forth.

2. The combination in a box for electrical connections, of a metal frame, a block of insulating material held thereby, circuit-connections upon such block, an inclosing-cover, and openings for admitting the conductors into the box, substantially as set forth.

3. The combination of the insulating-base, the connections upon such base, the inclosing metal cover, and an intervening insulation between the cover and the connections, substantially as set forth.

4. The combination, with an inclosing-box, and an insulating-block within the same, of metal plates secured to such block, means for connecting electrical conductors with such plates, and safety-catches connecting said plates, substantially as set forth.

5. The combination, with an inclosing-box having an insulating-block, of plates secured upon such block, the socket screw-rings and bottom terminals formed integral with such plates, safety-catch plugs, and means for connecting the conductors with the said plates, substantially as set forth.

6. The combination, with an inclosing-box, of the tube-opening, the tube having flat conducting-rods and the vertical clamping-plates for receiving said conducting-rods, substantially as set forth.

7. The combination, with a conductor formed of a bundle of wires, of clamping-plates between which the wires are clamped, and a raised edge extending across the wires, and over which the wires are bent in clamping, substantially as set forth.

This specification signed and witnessed this 27th day of November, 1882.

CALVIN GODDARD.

Witnesses:
H. W. SEELY,
EDWARD H. PYATT.